United States Patent
Engel

(10) Patent No.: US 8,353,149 B2
(45) Date of Patent: Jan. 15, 2013

(54) FORAGE HARVESTER WITH A CONDITIONING UNIT MOVABLE BETWEEN AN OPERATING POSITION AND A NON-OPERATING POSITION

(75) Inventor: Manfred Engel, Großsteinhausen (DE)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 13/024,416

(22) Filed: Feb. 10, 2011

(65) Prior Publication Data

US 2012/0180446 A1    Jul. 19, 2012

(51) Int. Cl.
*A01D 61/00* (2006.01)
(52) U.S. Cl. .................................. 56/16.4 R; 56/16.4 A
(58) Field of Classification Search ............... 56/16.4 R, 56/16.4 A, 16.4 B, 14.3, 16.6, 153, DIG. 1, 56/DIG. 9; 241/101.01, 101.02, 101.74
See application file for complete search history.

(56) References Cited

U.S. PATENT DOCUMENTS

| | | | | |
|---|---|---|---|---|
| 3,977,165 A * | 8/1976 | Klinner et al. | ............ | 56/16.4 R |
| 4,696,432 A * | 9/1987 | Russ et al. | ............ | 241/101.742 |
| 4,767,067 A * | 8/1988 | Bruer et al. | ............ | 241/81 |
| 5,863,005 A * | 1/1999 | Bramstedt et al. | ...... | 241/101.742 |
| 6,425,232 B1 * | 7/2002 | Desnijder et al. | .......... | 56/16.4 B |
| 6,539,693 B2 * | 4/2003 | Krone et al. | ................... | 56/16.6 |
| 6,604,352 B1 * | 8/2003 | Tyvaert et al. | ............ | 56/16.4 B |
| 6,988,352 B2 * | 1/2006 | Van Vooren | ................ | 56/16.4 R |
| 2007/0191179 A1 * | 8/2007 | Hugenroth et al. | ............... | 477/2 |

FOREIGN PATENT DOCUMENTS

| | | |
|---|---|---|
| DE | 3522376 A1 * | 1/1987 |
| DE | 4215696 A1 * | 11/1993 |

* cited by examiner

*Primary Examiner* — Arpad Fabian-Kovacs

(57) ABSTRACT

A self-propelled forage harvester is provided having a frame, a chopping drum, an accelerator arranged downstream of the chopping drum and a channel between the chopping drum and the accelerator. The channel has a section in which a conditioning unit or a hollow shell can be selectively inserted. The conditioning unit and the hollow shell are jointly supported on a pivot arm pivotable by way of a displacement drive about a pivot axis running horizontally and transverse to the forward direction. The conditioning unit is mounted on the pivot arm rotatably about an axis parallel to the pivot axis. The conditioning unit cooperates with the frame by way of a positive guide, which has the effect that the conditioning unit rotates about the axis in the same direction as the pivot arm.

10 Claims, 4 Drawing Sheets

FORAGE HARVESTER WITH A CONDITIONING UNIT MOVABLE BETWEEN AN OPERATING POSITION AND A NON-OPERATING POSITION

FIELD OF THE INVENTION

The invention relates to a self-propelled forage harvester with a frame, a chopping drum, an accelerator arranged downstream of the chopping drum and a channel between the chopping drum and the accelerator. The channel has a section in which a conditioning unit or a hollow shell can be selectively inserted, wherein the conditioning unit and the hollow shell are jointly supported on a pivot arm pivotable by means of a displacement drive about a horizontal axis. The arm is movable between an operating position of the conditioning unit, in which the conditioning unit is in the section, and a non-operating position of the conditioning unit, in which the shell is in the section.

BACKGROUND OF THE INVENTION

Forage harvesters are used for harvesting whole plants or their parts which are picked up from a field by means of a harvester head, pressed together by means of pressing rollers and led to a cutter drum, whose chopping cutters comminute the plants in cooperation with an opposing cutter. Then the comminuted plants or parts are optionally supplied to a conditioning unit and conveyed by an acceleration unit into an ejection chute that loads them onto a transport vehicle. The comminuted plants generally are used as animal feed or for generating biogas.

The conditioning unit generally comprises two or more rollers driven in opposite directions that are pre-stressed against one another by spring force and between which the chopped material is fed. It is required for corn harvesting to beat the kernels contained in the chopped material and improve the digestibility of the feed. Conditioning is not required for grass harvesting, on the other hand, for which reason the rollers of the conditioning unit are either brought into a position in which a sufficiently large gap remains between them, or the conditioning unit is pivoted out of the channel between the chopper drum and the accelerator and a hollow shell is inserted in its place.

Such a forage harvester is disclosed in DE 42 15 696 A1, which is considered class-forming. The conditioning unit is mounted there on a pivot arm, which also supports the hollow shell. The pivot axis of the pivot arm is located above the housing of the accelerator and slightly to the rear of the axis of rotation of the accelerator with respect to the forward direction of the forage harvester. In the non-operating position, the conditioning unit is behind the channel, rising upward toward the rear, between the chopping drum and the accelerator.

In DE 42 15 696 A1, the conditioning unit is moved between its operating position and its non-operating position only about the pivot axis of the pivot arm. In its non-operating position, it projects relatively far backward and upward into the area behind the accelerator and thus requires a considerable space.

The problem underlying the invention is to improve a forage harvester in the sense that the conditioning unit is brought into a space-saving position in its non-operating position.

SUMMARY OF THE INVENTION

A forage harvester comprises a frame on which a chopping drum and an accelerator are mounted. A channel extends between the chopping drum and the accelerator. In an (interrupted) section of the channel, a conditioning unit can be inserted for corn harvesting, or a hollow shell can be inserted in its place for harvesting grass or other plants. A pivot arm, pivotable about a pivot axis running horizontally and transverse to the forward direction, holds the conditioning unit and the hollow shell. The pivot arm is movable about the pivot axis between an operating position of the conditioning unit, in which the conditioning unit is in the section of the channel and the hollow shell is situated outside the channel, and a non-operating position, in which the conditioning unit is situated outside the channel and the hollow shell is in the section of the channel. The conditioning unit is in turn articulated to the pivot arm about an axis running parallel to the pivot axis. A positive guide couples the conditioning unit to the frame in such a manner that the conditioning unit is rotated in the same direction as the pivot arm. If the pivot arm is thus rotated from the operating position in the direction toward the non-operating position, the conditioning unit rotates by an additional angle in this direction. If the pivot arm and the axis move upward on the way from the operating position into the non-operating position, the conditioning unit moves even further upward in relation thereto.

This has the effect that the conditioning unit occupies a space-saving, upward-rotated position in its non-operating position.

The positive guide in one embodiment of the invention is composed of a plate with a slot and a driver that engages in the slot. The slot can be straight or curved. Alternatively, any other desired positive guides can be used, which are equipped, for example, with rollers and rails or flexible traction means (chains or cables).

In the above-mentioned embodiment, it is advisable to couple the plate rigidly to the conditioning unit, whereas the driver can be mounted on the housing of the accelerator. A converse arrangement, with a driver mounted on the conditioning unit and a plate mounted on the housing of the accelerator, would also be conceivable.

If the conditioning unit will not be used in the near future, as for grass harvesting in the spring, it is preferably dismounted from the forage harvester and stored until the next usage. A removable mounting of the conditioning unit on a holder is therefore advisable. The holder is in turn rotatably seated on the pivot arm and connected to the plate.

The conditioning unit can be mounted on the holder by angle braces or a channel, under which suitable projecting elements (e.g., rollers) of a support assembly of the conditioning unit reach. The conditioning unit can therefore be pulled out of the holder by a suitable lifting device and lifted out of the forage harvester, preferably after a lock of the conditioning unit on the holder has been released.

In its non-operating position, the conditioning unit is preferably seated behind the section of the channel relative to the forward direction of the forage harvester. In that location, a larger or smaller free space, accessible from the side, which is followed toward the rear by a space accommodating the internal combustion engine, is typically located. The conditioning unit can be pulled out of the holder by means of the lifting device, raised, removed from the free space and later inserted again, wherein it is advisable to equip the conditioning unit with coupling points (hooks, eye bolts or the like) for the lifting device. The lifting device can be a separate crane, forklift or front loader, or it can be removably or permanently fixed to the forage harvester.

The pivot axis of the pivot arm typically lies behind and/or above the accelerator's axis of rotation, i.e., a distance away from the axis of rotation. The conditioning unit is driven by a belt drive that comprises a belt sheave in motive connection to the shaft of the accelerator. Other belt sheaves then drive the rollers of the conditioning unit, wherein additional idle and/or tension rollers for the belt can be provided. The positioning of the pivot arm's pivot axis and the positive guide ensure that the belt is relaxed with the conditioning unit brought into the non-operating position and therefore can be taken off for removal of the conditioning unit, or the motive connection to the conditioning unit is interrupted when it is in the non-operating position. In the operating position on the other hand, the belt is tensioned. The shaft of the accelerator can be driven on the side of the accelerator opposite the above-mentioned belt by an additional belt, which can also drive the chopping drum.

The displacement operation for moving the conditioning unit between the operating position and the non-operating position can be accomplished by an externally operated (electric or hydraulic) motor or cylinder, or by manual operation. The rotational movement of the drive is preferably implemented by means of a spindle that is driven by the motor or a crank and operates a lever mechanism together with the pivot arm.

BRIEF DESCRIPTION OF THE DRAWINGS

The embodiments of the invention are described in detail below with reference to the accompanying drawings wherein.

DESCRIPTION OF THE PREFERRED EMBODIMENT

Figure 1:
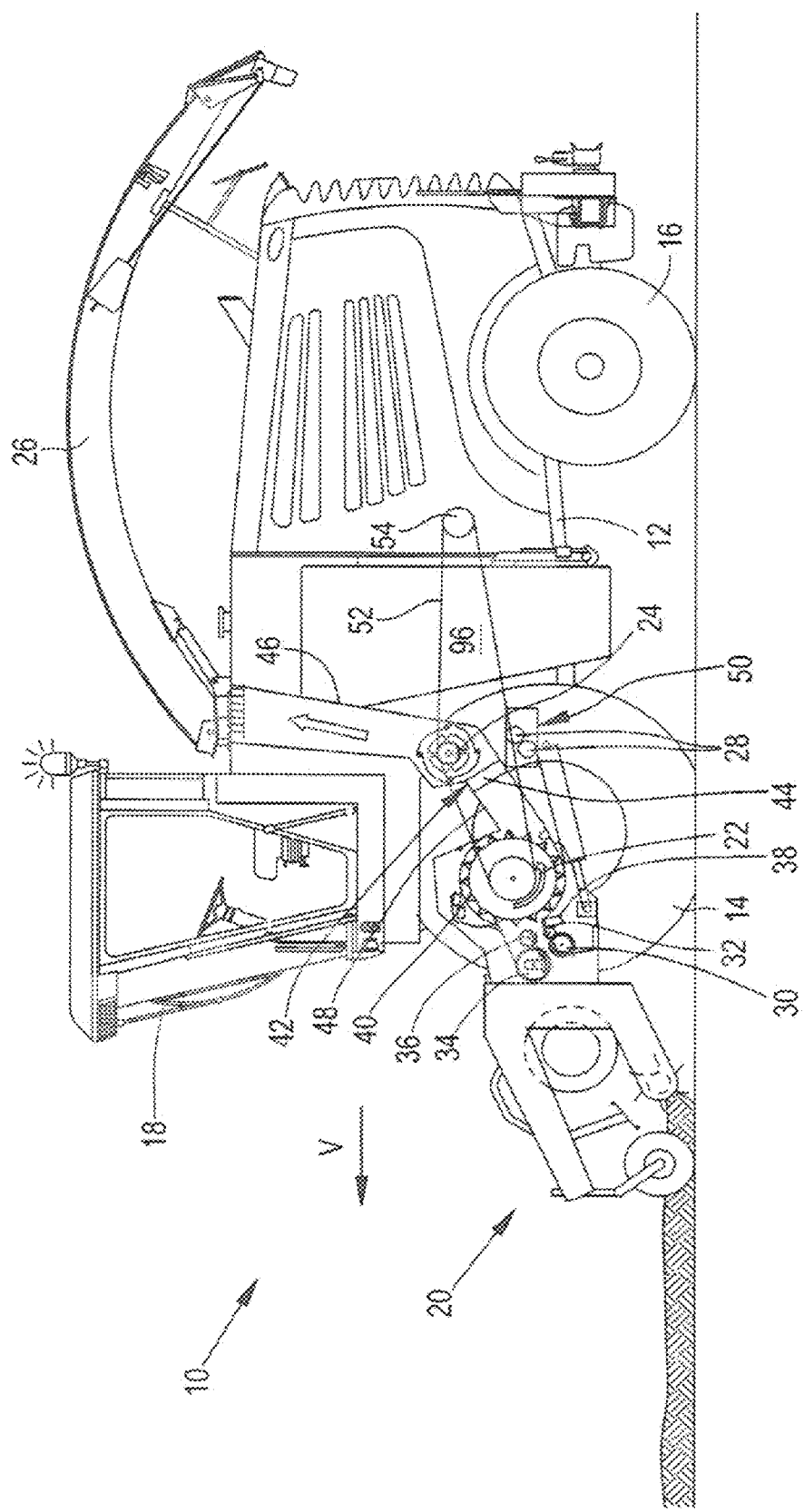
FIG. 1 shows a self-propelled forage harvester in a side view and a schematic representation.

A self-propelled forage harvester 10 shown in FIG. 1 is constructed on a frame 12 that is supported by front and rear wheels 14 and 16. The forage harvester 10 is operated from a driver's cab 18, from which the crop gathering device 20 in the form of a pickup can be seen. Crop, e.g., grass or the like, picked up from the ground by means of the crop gathering device 20 is fed in harvesting mode to a chopping drum 22 equipped with chopping cutters 40 which chop it into small pieces in cooperation with a shear bar 38 and transfer it to an accelerator 24. Between the crop gathering device 20 and the chopping drum 22, the crop is transported by lower compression rollers 30, 32 and upper compression rollers 34, 36. Via a discharge shaft 46 and an ejection chute 26 rotatable about the vertical axis and height-adjustable at the injection end, the crop exits from the harvester 10 downstream of the accelerator 24 to a trailer traveling alongside. Directional indications such as front and back refer below to the forward direction V of the forage harvester 10, which runs to the left in FIG. 1.

In a channel 48, rising toward the rear, between the chopping drum 22 and the conveyor device 24, there is a section 42 in which, instead of a hollow shell 44 used for grass harvesting, a conditioning unit 50 with two rollers 28 can be inserted selectively. The section 42 thus constitutes an interruption in the channel 48, into which the conditioning unit 50 or the shell 44 can alternatively be inserted. The conditioning unit 50 is particularly necessary for corn harvesting in order to beat the kernels contained in the chopped material for better animal digestibility. For corn harvesting, the crop gathering device 20 shown in FIG. 1 is replaced by a corn picker head. For grass harvesting, however, the shell 44 is inserted into the section 42 as shown in FIG. 1, since no further processing is required.

The chopping drum 22 and the accelerator 24 are driven via a belt 52 driven by a belt sheave 54 which is driven via a suitable gear mechanism (not shown) by an internal combustion engine (not shown) arranged behind a free space 96.

Figure 2:
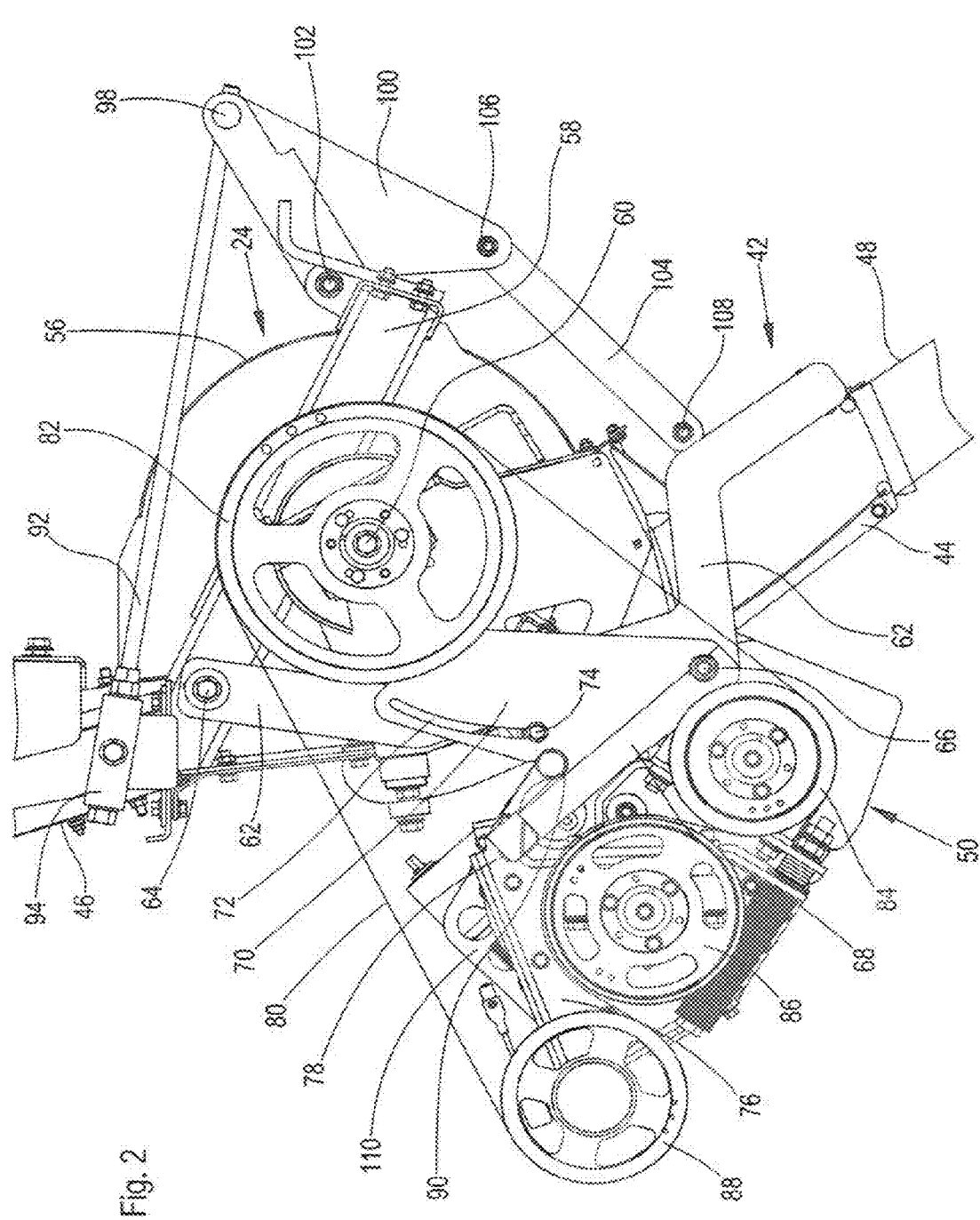
FIG. 2 shows a view in contrast to FIG. 1 from the other side of the forage harvester of a section of the channel between the chopping drum and the accelerator, with a conditioning unit in the non-operating position.

FIG. 2 shows the channel 48 and the accelerator 24 (in contrast to FIG. 1, which shows the left side of the forage harvester 10) from the other, right side in an enlarged representation. As in FIG. 1, a hollow shell 44, which contains no conveyance equipment, is located in section 42. The conditioning unit 50 is situated in its non-operating position behind the section 42.

A support arm 58, running obliquely forward and down from the rear, upper end of the housing 56 of the accelerator 24, is mounted on the housing 56 and on the discharge shaft 46. A pivot arm 62, rotatable about a pivot axis 64 running horizontally and transverse to the forward direction, is supported on the support arm 58 above and to the rear of the axis of rotation 60 of the accelerator 24. The pivot arm 62 runs roughly in a C-shape downward and the hollow shell 44 is rigidly mounted at its lower area.

A holder 68 is seated on the pivot arm 62 rotatably about an axis 66 that runs parallel to the pivot axis 64. The holder 68 is further connected to a plate 70 running vertically and in the forward direction, into which an arc-shaped curved slot 72 is inserted. A driver 74 rigidly mounted on the housing 56 of the accelerator 24 engages in the slot 72. The holder 68 comprises additional angle pieces or the like directed horizontally inward toward the longitudinal center plane of the forage harvester 10 that form a channel into which protrude rollers or other elements likewise projecting outward, which are mounted on a support assembly 76 of the conditioning unit 50. The support assembly 76 with the conditioning unit 50 per se can thus be drawn out of the channel obliquely backward and upward after locking screws 78 have been removed. The conditioning unit 50 corresponds in its structure to the embodiment according to DE 10 2008 012 487 A1. The driving of the rollers of the conditioning unit is accomplished via a belt 80, which is driven by a belt sheave 82 driven by the shaft of the accelerator 24 and drives the rollers of the conditioning unit via belt sheaves 84, 86. A freely co-rotating belt sheave 88 is used to create a sufficient angle of wrap of the belt 82 around the central belt sheave 86. Another belt sheave (not shown) can be used to tension the belt 80.

A pivot arm 62 and a holder 68, which are mirror-symmetric to the elements shown in FIG. 2, are situated on the left side of the forage harvester 10. The two holders are connected to one another by means of a stabilizing bar 90.

Figure 3:
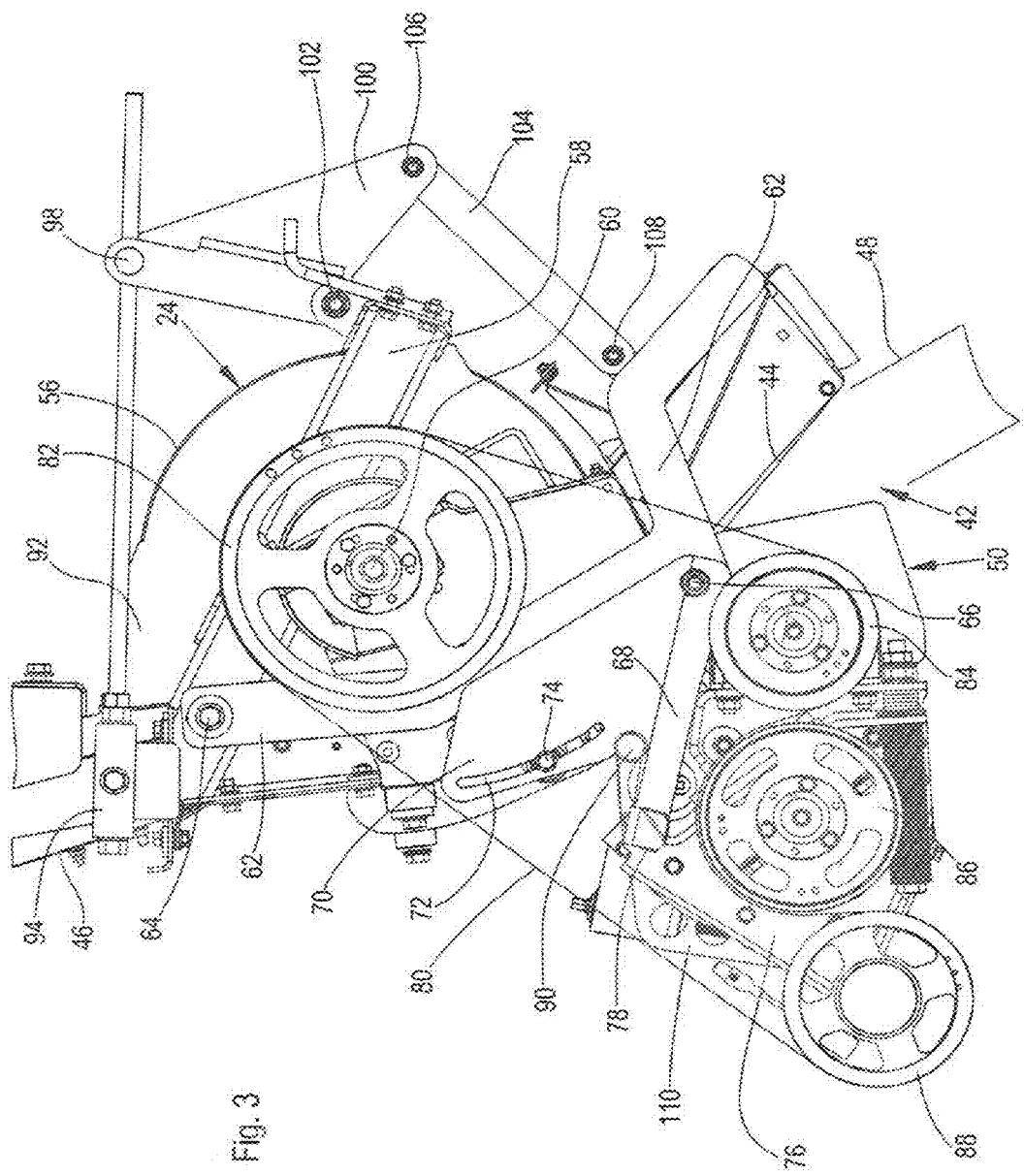
FIG. 3 shows a view according to FIG. 2, with a conditioning unit in the intermediate position; and, FIG. 4 shows a view according to FIG. 2, with a conditioning unit in the operating position.
Figure 4:
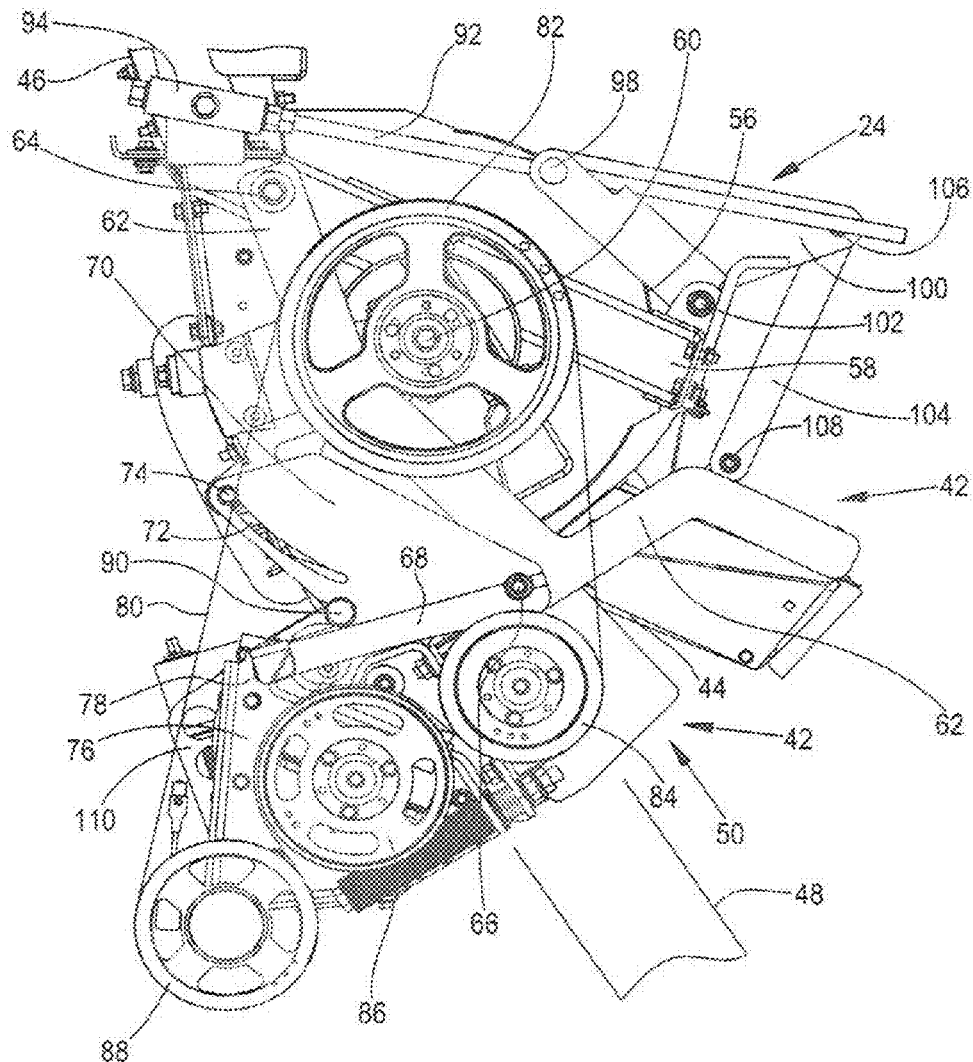

A displacement drive is used to move the conditioning unit 50 between the non-operating position shown in FIG. 2 via an intermediate position (FIG. 3) into the operating position (FIG. 4). The displacement drive comprises a rotatable spindle 92 which is supported in a bearing 94 at its end drawn at the left. A crank can be placed on the left side of the bearing 94 in order to drive the spindle 92 by hand. For this purpose, the operator can move into a free space 96 (see FIG. 1) that is accessible from the right side of the forage harvester 10. It would also be conceivable to turn the spindle with a removable motor (of a power drill, for example) or a permanently installed motor. The spindle 92 cooperates with the inside thread of a rod 98 that is rotatable about an axis extending horizontally and transverse to the forward direction seated on a swing plate 100. The swing plate 100 is articulated to the front end of the support 58 pivotably about an axis 102 running horizontally and transverse to the forward direction. It is also pivotably connected to a rod 104 about an axis 106 running horizontally and transverse to the forward direction. The rod 104 is articulated at its other end to the pivot arm 62 pivotably about an axis 108 extending horizontally and transverse to the forward direction Based on all of the above, one obtains the motion kinematics of the shell 44 and the conditioning unit 50 as recognizable from FIGS. 2-4. When the displacement drive is moved, and the spindle 92 rotates clockwise, starting from the non-operating position of the conditioning unit in accordance with FIG. 2, the pivot arm 62, and thus also the shell 44, moves counterclockwise. The positive guide formed from the plate 70 with the slot 72 and the driver 74 has the effect that the holder 68 with the conditioning unit 50 rotates relative to the pivot arm 62 about the axis 66, namely counterclockwise, like the pivot arm 62. In the operating position, the conditioning unit 50 is situated in the section 42. The return movement takes place analogously by rotating the spindle 92 counterclockwise. The pivot arm 62 also moves clockwise and the holder 68 with the conditioning unit 50 likewise moves clockwise, i.e., upward with respect to the pivot arm 62, about the axis 66. Thereby a relatively vertical, compact position of the conditioning unit 50 in its non-operating position is achieved. On the upper side of the support assembly 76 for the conditioning unit 50, a plate 110 is mounted, with openings to which a hook or eye bolt of a lifting device can be attached that can be used (after removal of the slightly relaxed belt 80 in a position according to FIG. 2) for pulling the conditioning unit 50 out of the holder and removing it from the free space 96. The pivot axis 64 and the positive guide are positioned in such a manner that the belt 80 is tensioned in the operating position according to FIG. 4 and is slightly relaxed in the non-operating position according to FIG. 2 and can thus be easily taken off and put in place.

Having described the preferred embodiment, it will become apparent that various modifications can be made without departing from the scope of the invention as defined in the accompanying claims.

The invention claimed is:

1. A self-propelled forage harvester having a frame, a chopping drum, an accelerator arranged downstream of the chopping drum, and a channel between the chopping drum and the accelerator, the channel having a section in which one of a conditioning unit and a hollow shell can be selectively inserted, wherein the conditioning unit and the hollow shell are jointly supported on a pivot arm pivotable by means of a displacement drive about a first pivot axis running horizontally and transverse to the forward direction, which arm is movable between an operating position of the conditioning unit, in which the conditioning unit is in the section, and a non-operating position of the conditioning unit, in which the shell is in the section, wherein the conditioning unit is mounted on the pivot arm rotatably about a second axis parallel to the first pivot axis and wherein the conditioning unit cooperates with the frame by means of a positive guide, which has the effect that the conditioning unit rotates about the second axis in the same direction as the pivot arm rotates around the first pivot axis.

2. A self-propelled forage harvester according to claim 1, wherein the positive guide comprises a plate with a slot in which a driver engages.

3. A self-propelled forage harvester according to claim 1, wherein the plate is rigidly connected to the conditioning unit and wherein the driver is connected to the housing of the accelerator.

4. A self-propelled forage harvester according to claim 1, wherein the conditioning unit is detachably mounted in a holder that is seated rotatably on the shaft and coupled to the plate.

5. A self-propelled forage harvester according to claim 4, wherein the conditioning unit is displaceably seated on the holder.

6. A self-propelled forage harvester according to claim 4, wherein the conditioning unit is situated in its non-operating position behind the section and is equipped with one or more coupling points for a lifting device with which it can be lifted out.

7. A self-propelled forage harvester according to claim 1, wherein the pivot axis is arranged one of behind and above the axis of rotation of the accelerator.

8. A self-propelled forage harvester according to claim 7, wherein the conditioning unit is drivable via a belt that is motively connected to the drive shaft of the accelerator and wherein the belt is relaxed when the conditioning unit is brought into the non-operating position, and is tensioned when the conditioning unit is brought into the operating position.

9. A self-propelled forage harvester according to claim 1, wherein displacement can be accomplished by one of manually and by external force.

10. A self-propelled forage harvester according to claim 9, wherein the displacement drive comprises a spindle that cooperates via a lever mechanism with the pivot arm.

\* \* \* \* \*